K. HODGE.

STEERING WHEEL.

APPLICATION FILED AUG. 29, 1913.

1,114,762. Patented Oct. 27, 1914.

Witnesses
Oliver M. Kappler
H. B. Fay.

Inventor
Karl Hodge

By Fay & Oberlin
Attorneys —

UNITED STATES PATENT OFFICE.

KARL HODGE, OF ONAWAY, MICHIGAN.

STEERING-WHEEL.

1,114,762. Specification of Letters Patent. Patented Oct. 27, 1914.

Application filed August 29, 1913. Serial No. [illegible]

*To all whom it may concern:*

Be it known that I, KARL HODGE, a citizen of the United States, and a resident of Onaway, county of Presque Isle, and State of Michigan, have invented a new and useful Improvement in Steering-Wheels, of which the following is a specification, the principle of the invention being herein explained and the best mode in which I have contemplated applying that principle, so as to distinguish it from other inventions.

The present invention relates to steering wheels for vehicles and particularly to the type of steering-wheels in which a central spider is used having a number of radially disposed arms, the ends of the arms being attached to an annular wooden wheel. This is a type of steering wheel which is used on the great majority of motor vehicles now made in this country.

The present invention has to do with a new and extremely safe means for attaching the arms of the spider to the annular rim, this means being extremely simple and costing but very little more to make than the means now in use which are far from satisfactory.

To the accomplishment of these and related ends said invention then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
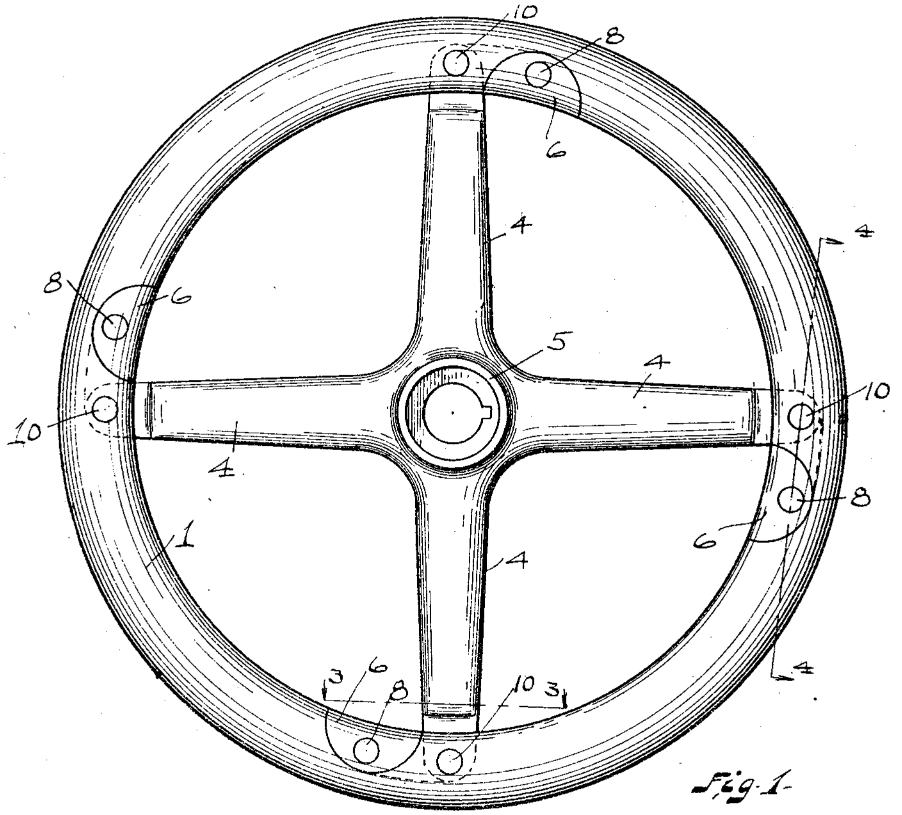
Figure 2:
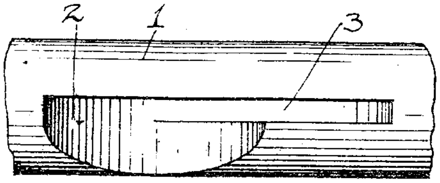
Figure 3:
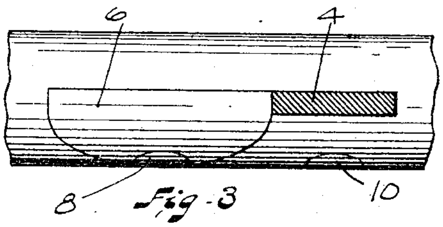
Figure 4:
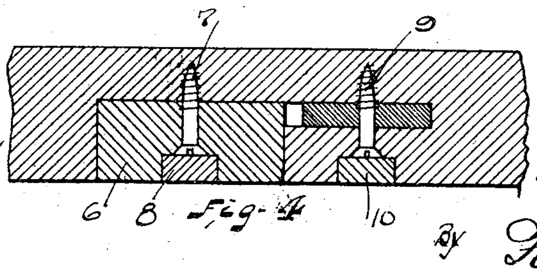

Figure 1 is a plan view of the underside of the wheel when finished; Fig. 2 is a side elevation showing a part of the rim before the attachment of the spider; Fig. 3 shows a similar view with the spider inserted in the rim and the attaching means in position and Fig. 4 is a section on the line 4—4, Fig. 1.

Steering wheels of this type are constructed in two parts, the rim proper and the spider which must be attached thereto. The spider is usually cast integral with the arms, of which there are preferably four, and it is therefore impossible to merely cut out a slot on the under side of the rim and to shove in the ends of the spider arms. It has been customary, therefore, to cut out a semi-circular portion of the rim on its under side, thus providing an open recess in which the [illegible] spider [illegible] inserted, the [illegible] being closed by means of a suitably [illegible] plug which is intended [illegible] by the use of [illegible] the rim proper. The difficulty [illegible] construction is that after [illegible] little [illegible] plug which is generally [illegible] further [illegible] through said plug [illegible] becomes loose, [illegible] varnish or enamel [illegible] of the wooden rim [illegible] loose and dropping [illegible] is extremely dangerous [illegible] of the steering mechanism [illegible] frequently been the cause of [illegible].

In Fig. 2 [illegible] can be best seen [illegible] rim 1 I cut out a [illegible] suitably shaped portion [illegible] single recess 2 and adjacent [illegible] recess I cut out an undercut groove [illegible] adapted to receive snugly the outer end of a spider arm 4. Although referring [illegible] recess and one groove there will [illegible] plurality of such recesses [illegible] equal intervals around the [illegible] in order [illegible] of all the spider arms attached [illegible]. It will be understood that while the [illegible] is preferably semi-circular in form yet the precise shape is a matter of [illegible] difference. Also an undercut [illegible] adjoining each [illegible] and the spider [illegible] may be moved [illegible] slight rotation of the [illegible] have first been placed [illegible]. After the movement of [illegible] I place [illegible] or other [illegible] which are snugly and [illegible] the walls of the [illegible] plug [illegible] glued to the rim and [illegible] held against disengagement. [illegible] particularly noted that the [illegible] plug referred to in my invention [illegible] great advantage over the older [illegible] construction, in that both its sides and broad bottom form, with the adjacent surfaces of the recess in the wooden rim, a [illegible] strong glue or cement joint [illegible] the older form of construction [illegible] and most important [illegible] of the wooden covering plug [illegible] the foot of the metal spider and [illegible] will not adhere to metal by use of glue or cement with near the tenacity that it will to wood. I further insure against any such action by providing a screw 7 which passes through the plug and the rim and is countersunk in the plug, being covered up by a short wooden plug 8 which is smoothed down to form a part of the rim itself. A similar screw 9 is used to attach the end of the spider arm 4 to the rim 1, this screw being covered in the same manner by a plug 10.

In this construction the tendency of the spider arm to loosen itself from the wood above and below the same is prevented by reason of the position of the plug, which is fitted in at one side of the arm. The plug is securely prevented from movement by being glued to the rim and by the screw already mentioned. By far the greater part of the strain is taken off the plug and is put onto the rim itself. There is now no possibility of the spider coming loose in the rim or of the plug being disengaged.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of an annular wooden member having an undercut groove on its inner periphery and an open semi-circular or other suitably shaped recess adjoining such groove, an arm adapted to be laid in such recess and moved into such groove, said arm being then entirely clear of such recess, a pin adapted to maintain said arm in such groove, a semi-circular or other suitably shaped plug adapted to be snugly and permanently fitted into such recess, the plug and sides of the recess being in contact thereby providing adequate gluing surface.

2. In a device of the character described, the combination of an annular wooden wheel having a plurality of undercut grooves spaced at intervals around its inner periphery, and an equal number of open semi-circular recesses disposed adjacent to such grooves, a spider having a plurality of radial arms adapted to be laid in such open recesses and moved into such grooves, a plurality of semi-circular wooden plugs adapted to be snugly fitted into such recesses, the plugs and the sides of the recesses being in contact, thereby providing adequate gluing surface, and pins adapted to further insure the maintenance of said plugs in such recesses.

3. In a wheel of the character described, the combination of a spider having a plurality of radially extending arms; an annular rim having a plurality of slots lying in the plane of said rim and opening on its inner periphery, said rim also having recesses opening into such slots, respectively, and intersecting a lateral face of said rim, the outer ends of such spider arms being adapted to be laid in such recesses and thereupon rotated into engagement with such slots; and plugs fitted to such recesses and adapted to lock such arm-ends in such engagement.

Signed by me, this 25th day of August, 1913.

KARL HODGE

Attested by—
NELLIE BEEBE,
CLARA L. PETRÉ.